(12) United States Patent
Kaye

(10) Patent No.: US 7,136,205 B1
(45) Date of Patent: Nov. 14, 2006

(54) VOLUME-PHASE HOLOGRAPHIC DIFFRACTION GRATING OPTIMIZED FOR THE ULTRAVIOLET SPECTRAL REGION

(75) Inventor: Anthony Bresenhan Kaye, Albuquerque, NM (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 11/255,955

(22) Filed: Oct. 24, 2005

(51) Int. Cl.
*G03H 1/02* (2006.01)

(52) U.S. Cl. .................. 359/3; 359/4; 430/1; 430/2

(58) Field of Classification Search ............... 359/3–7; 430/1–2
See application file for complete search history.

(56) References Cited

U.S. PATENT DOCUMENTS

| | | | |
|---|---|---|---|
| 3,567,444 A * | 3/1971 | Shankoff | 430/1 |
| 5,363,220 A | 11/1994 | Kuwayama et al. | |
| 5,475,512 A | 12/1995 | Nakazawa et al. | |
| 5,633,100 A * | 5/1997 | Mickish et al. | 430/1 |
| 5,642,209 A | 6/1997 | Baker | |
| 5,726,782 A * | 3/1998 | Kato et al. | 359/3 |
| 6,160,645 A * | 12/2000 | Chandross et al. | 359/3 |
| 6,343,170 B1 | 1/2002 | Sela | |
| 2006/0014081 A1 * | 1/2006 | Hayase et al. | 430/1 |

OTHER PUBLICATIONS

Bernstein et al. "A Volume-Phase Holographic Spectrograph for the Magellan Telescopes", Department of Astronomy, University of Michigan.

* cited by examiner

*Primary Examiner*—Leonidas Boutsikaris
(74) *Attorney, Agent, or Firm*—Edell, Shapiro & Finnan, LLC

(57) ABSTRACT

A volume-phase holographic diffraction grating device is provided that can be optimized for use with very short wavelength light, such as light in the ultraviolet (UV) spectral region. The device comprises a cover and a substrate, both formed of a glass material. A layer of gelatin material is disposed between the cover and the substrate member, and has holographically-formed varying indexes of refraction formed therein to set up the interference pattern. The gelatin material has a thickness between 0.5 and 1 micron that makes it suitable for diffracting light in the UV spectral region, long-lived, and very efficient.

23 Claims, 6 Drawing Sheets

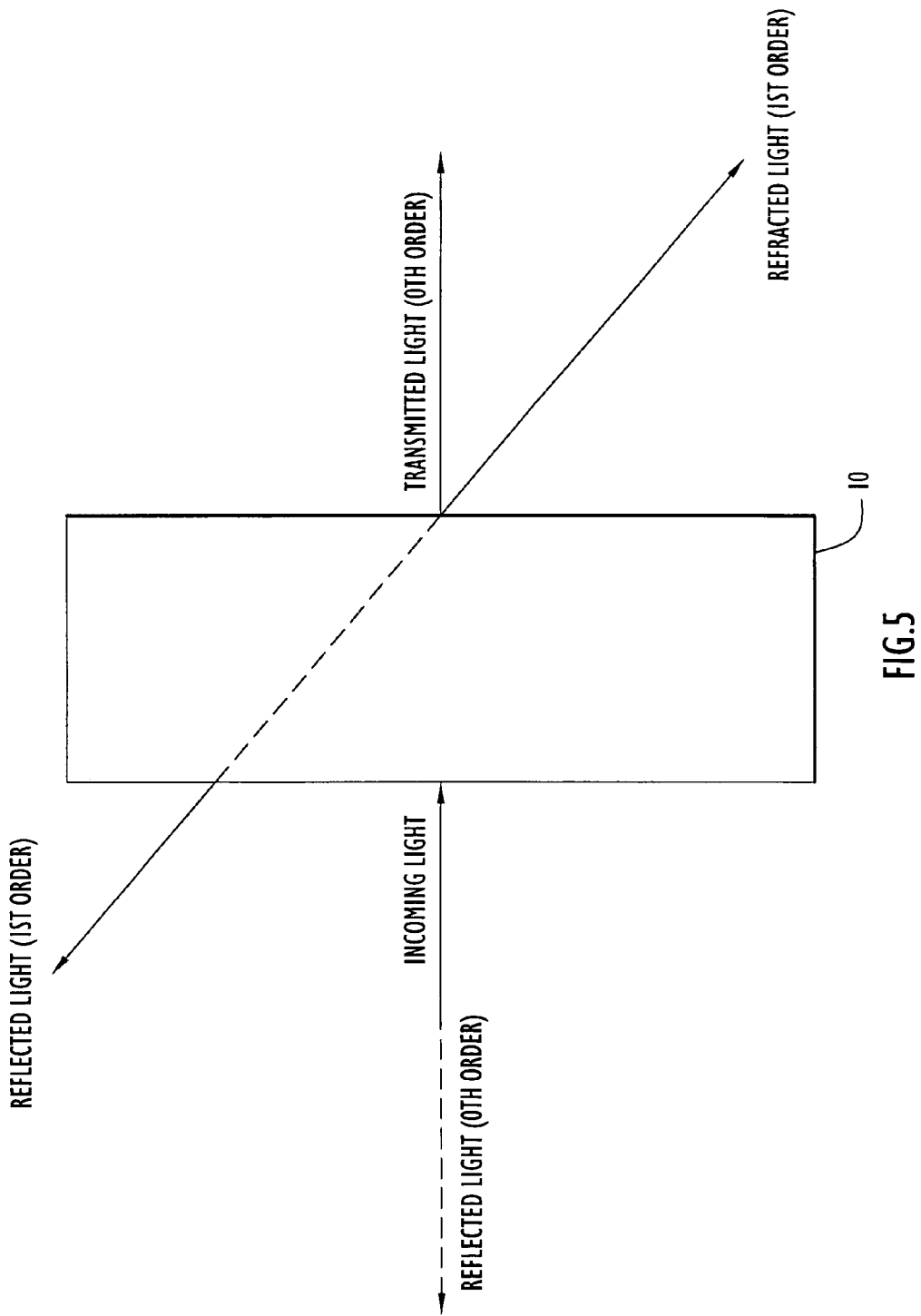

VOLUME-PHASE HOLOGRAPHIC DIFFRACTION GRATING OPTIMIZED FOR THE ULTRAVIOLET SPECTRAL REGION

BACKGROUND OF THE INVENTION

The present invention relates to diffraction devices used in optical systems and devices, and more particularly to a volume-phase holographic diffraction device designed for performance in short-wavelength (i.e., ultraviolet) spectral regions.

Optical sensors often rely on information gathered from certain bands of light reflected or scattered from a material or object under investigation. In particular, energy associated with Raman scattering in the ultraviolet (UV) spectral region may be of interest in identifying certain materials. Because of the intrinsically weak nature of the signals on which these devices operate, the devices used to detect these weak signals should be as optically efficient as possible. Moreover, in a spectrograph, the light dispersion element (in many cases, a diffraction grating), is the major source of light loss. Other surfaces used to direct or otherwise modify the incoming signal add to the noise (from scattering) and attenuate the strength of the optical beam (from absorption). Thus, it is desirable to optimize the efficiency of each component in the spectrograph, and in particular the efficiency of the diffraction grating.

Another important factor in the design of an optical element, such as a diffraction grating, is its aging parameters. The materials used in fabricating the diffraction grating may break down over time from exposure to light, and may do so faster if the material interacts with the light in certain ways.

Conventional design philosophy for volume-phase holographic diffraction gratings has been that a gelatin material would not be suitable for a grating that is to operate on very short wavelengths of light. Many experts in the field believe that the gelatin material would absorb too much of the incoming light (and would thus be unsuitable in this wavelength regime) and would decay quickly. To the contrary, it has been discovered and as presented hereinafter, that a diffraction grating using a gelatin material can be optimized for operation on short wavelength light, such as light in the UV spectral region.

SUMMARY OF THE INVENTION

Briefly, a volume-phase holographic diffraction grating device is provided that can be optimized for use with very short wavelength light, such as light in the ultraviolet (UV) spectral region. The device comprises a cover and a substrate, both formed of a glass material. A layer of gelatin material is disposed between the cover and the substrate member, and has holographically-formed varying indexes of refraction formed therein to disperse and diffract incoming light. The gelatin material has a thickness between 0.5 and 1 micron that makes it suitable for diffracting light in the UV spectral region and very efficient. This grating design does not suffer from aging degradations.

BRIEF DESCRIPTION OF THE DRAWINGS

FIG. 5 is a side view showing the grating in operation.

DETAILED DESCRIPTION

Figure 1A:
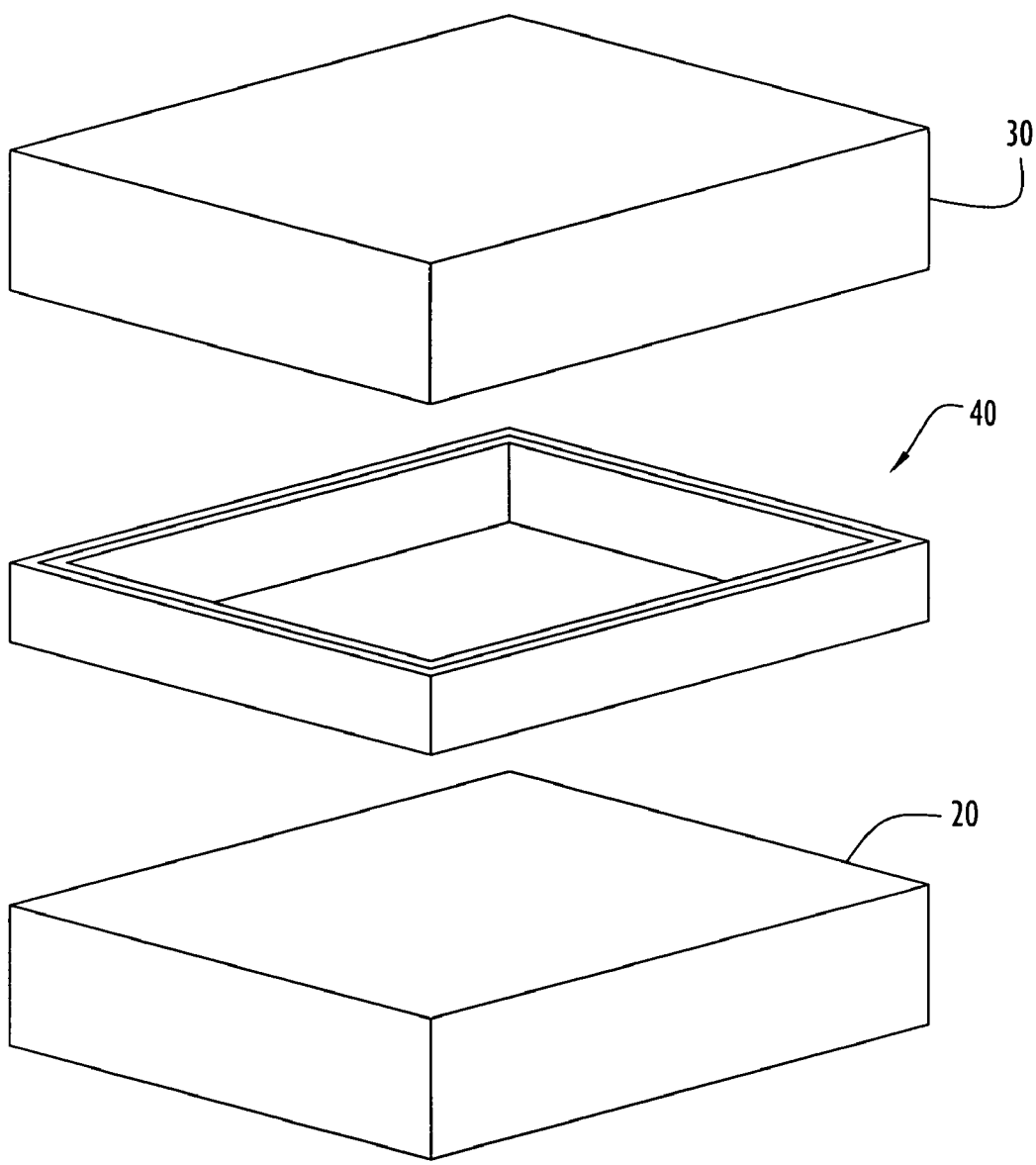
FIG. 1A is an exploded view of the diffraction grating according to the invention.
Figure 1B:
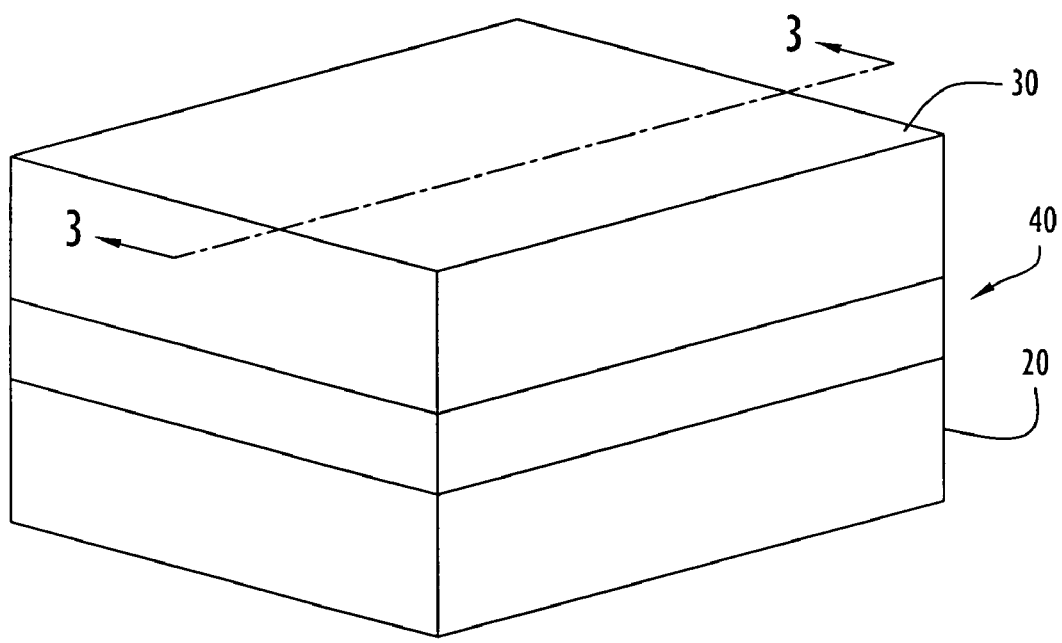
FIG. 1B is a perspective view of the diffraction grating device in assembled form.

Referring first to FIGS. 1A and 11B, the volume-phase diffraction grating is shown generally at reference numeral 10. The grating 10 comprises a first (substrate) layer or member 20 and second (cover) layer or member 30 and a frame assembly 40 sandwiched therebetween. While the substrate 20 and cover 30 are shown as being generally rectangular, they make take on any shape, and are formed of UV-grade fused silica or other suitable glass material. The substrate 20 and cover 30 are at least ¼-wave (HeNe) flat (a flatness measure known in the art), for example, and are glued to each other around the frame assembly 40 with a suitable adhesive.

An anti-reflection coating may be applied to air-glass interfaces of the substrate 20 and cover 30. For example, the anti-reflective coating should provide 99.5% or better transmissivity in the wavelength region of interest. A narrow-band or broad-band anti-reflection coating may be used depending on the application. Other coatings directed to other functions such as scratch resistance or to facilitate cleaning of the grating without affecting its performance may also be applied to the outer surfaces as desired.

Figure 2:
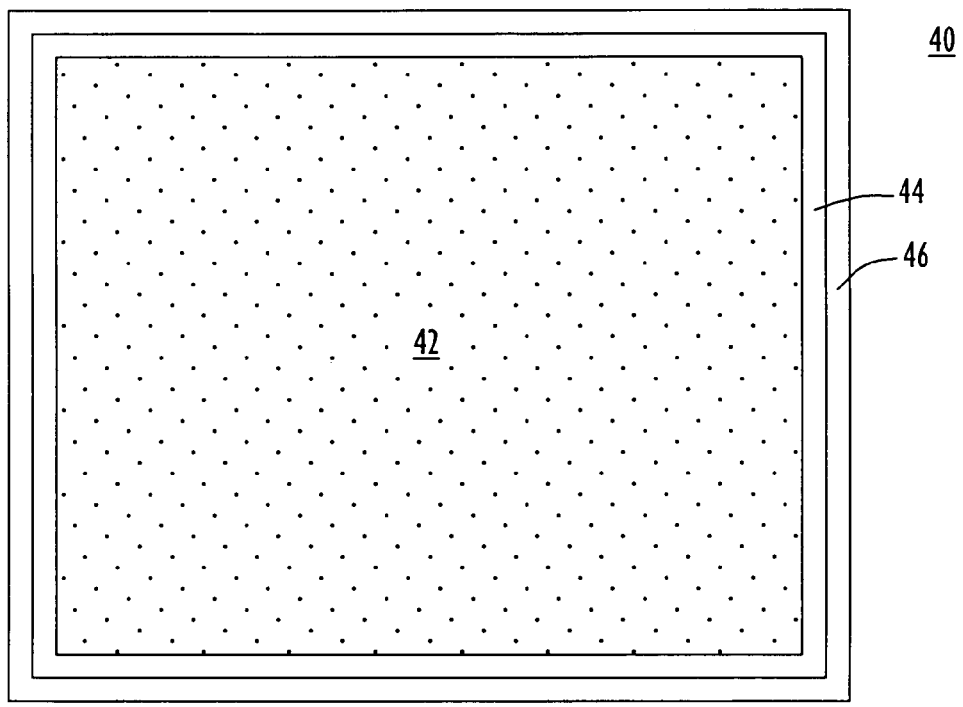
FIG. 2 is a top view of a frame assembly portion of the grating device.
Figure 3:
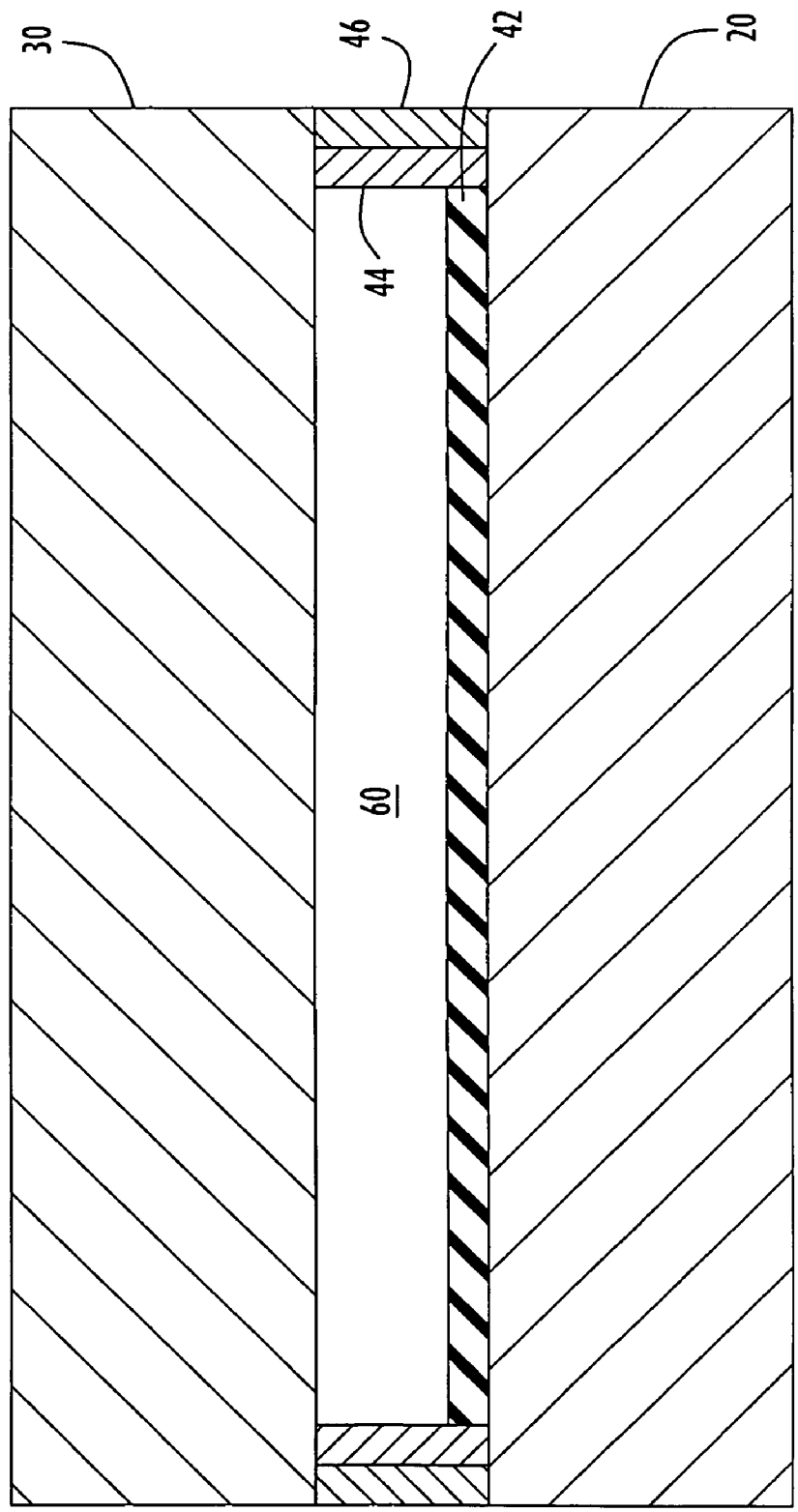
FIG. 3 is a cross-section taken through line 3—3 of FIG. 11B.

Turning to FIGS. 2 and 3, the frame assembly 40 is shown in more detail. The frame assembly 40 comprises a frame 44 surrounding the periphery of a dichromated gelatin layer 42. The frame 44 is formed of UV-grade fused silica or another appropriate material. On the outside of the frame 44 there is an adhesive material 46 that is used to hermetically seal the dichromated gelatin layer 42 without making contact with the gelatin layer 42.

The dichromated gelatin layer 42 must have the chromium (dichromate) removed by a suitable chemical process once the gel has set in order to minimize the scatter it creates. An interference pattern is set up and causes varying indexes of refraction within the hologram created in the gelatin layer 42. The number of "lines" associated with the hologram formed in the gelatin layer 42 is user-selectable and depends on the particular application of the grating. For example, the number of lines can range from small (e.g., 300) to reasonably large (6000 or more). Techniques for forming the hologram in a region of the gelatin layer 42 are well known in the art. Extremely high resolution may be achieved with a two pass-system where there is a mirror incorporated in the optical path.

FIG. 3 shows that the frame member 44 serves as a stand-off between the gelatin layer 42 and the cover 30. There is an air gap volume region 60 between the substrate 20 and the cover 30 in which the gelatin layer 42 is deposited and allowed to set on a surface of the substrate 20. The gelatin layer 42 does not completely fill the air gap volume region 60. The air gap 60 is necessary because the gelatin layer has such a small thickness it could not withstand the pressure of being sandwiched directly between the substrate 20 and cover 30. The frame member 44 also serves to physically isolate the adhesive 46 from the gelatin layer 42 so that the adhesive 46 does not contaminate the gelatin layer 42 and degrade performance of the grating. There may be an anti-reflective coating applied to the surface of the cover 30 that makes contact with the air gap 60. The adhesive 46 on the outside of the frame member 44 also adheres the substrate 20 to the cover 30.

Generally, the transmission of the grating decreases with increasing thickness of the gelatin layer 42. In addition, the sensitivity of the grating increases with increasing thickness; both relationships are wavelength dependent. It is important that the layer 42 have a very uniform thickness to minimize variation in performance in different areas of the grating. The dimensions of the grating may vary depending on the application. For example, the dichromated gelatin layer 42 may have a thickness in the range of approximately 0.5 to 1.0 microns to operate on unpolarized light in the 250–280 nm (UV) spectral region. In addition, the grating may be at least 110 mm square, having a clear aperture of at least 102 mm square.

The following sets forth the basis for determining the proper (ideal) thickness of the gelatin layer 42 for a volume-phase holographic grating (VPHG). For monochromatic light passing through a single material, the amount of transmission T is given by:

$$T \equiv \frac{I}{I_0} = e^{-\mu x} \quad (1)$$

Through experimentation, relevant values for these parameters are shown in Table 1.

TABLE 1

Measured and Derived Properties of Holographic Gelatin

| Physical Property | Value |
|---|---|
| T | 0.717 |
| ρ | 1.01 g cm$^{-3}$ |
| mean molecular mass | 2435.5065 g mole$^{-1}$ |
| μ | 3326.7844 cm$^{-1}$ |
| σ | 1.3321 × 10$^7$ b |
| test gelatin thickness | 1 μm |
| index of refraction (n) | 1.3 |
| modulation in n (Δn) | 0.14 |

TABLE 2

Desired Physical Properties of the VPHG in the UV Spectral Region.

| Physical Property | Value |
|---|---|
| Central wavelength (λ) | 260 nm |
| Maximum wavelength spread | 250–284 nm |
| Groove Frequency (Γ) | 4000 mm$^{-1}$ |
| Geometry considerations (θ) | 5–30° |
| Physical dimensions | 110 mm × 110 mm |
| Clear aperture size | 102 mm × 102 mm |
| Desired dispersion order (m) | 1 |

The grating equation describes the behavior of the VPHG:

$$\theta = \sin^{-1}\left(\frac{m\lambda\Gamma}{2n}\right). \quad (2)$$

Equation 2 indicates that the proper blaze angle θ for a 4000 lines/mm grating blazed for a wavelength of 260 nm in the first order is 23.°0578178, a value well within an allowed range of 5–30° as shown in Table 2. These parameters fix the blaze angle; the complete range of blaze angles considered here is 22.°619838–25.°907725 (a maximum Δθ of 3.°0287861) corresponding to wavelengths between 250–284 nm.

Once the blaze angle θ is known, the efficiency η of the grating is $$\eta = \sin^2\left(\frac{\pi \Delta n x}{\lambda \cos\theta}\right), \quad (3)$$

in which Δn is the modulation in refractive index, x is the thickness of the gelatin layer, λ is the wavelength of interest, and θ is the angle at which the incoming light strikes the gelatin (i.e., the blaze angle; see Kogelnick, H., 1969. *Bell Systems Technical Journal*, Volume 48, pp. 2909, ff.). If Δn=0.14 (from Table 1) and the 4000 lines/mm grating is blazed for 260 nm in the first order, the efficiency of the grating as a function of the gelatin thickness is $$\eta = \sin^2\left(\frac{\pi \cdot 0.14 \cdot x}{0.26 \cdot \cos 23.°5782}\right). \quad (4)$$

The ideal gelatin thickness is the thickness that simultaneously minimizes absorption and scattering (Equation 1) and maximizes efficiency (Equation 3). The performance of the grating is the product of these two equations, defined as $$\tau \equiv T \cdot \eta = e^{-\mu x} \sin^2\left(\frac{\pi \Delta n x}{\lambda \cos\theta}\right). \quad (5)$$

Figure 4:
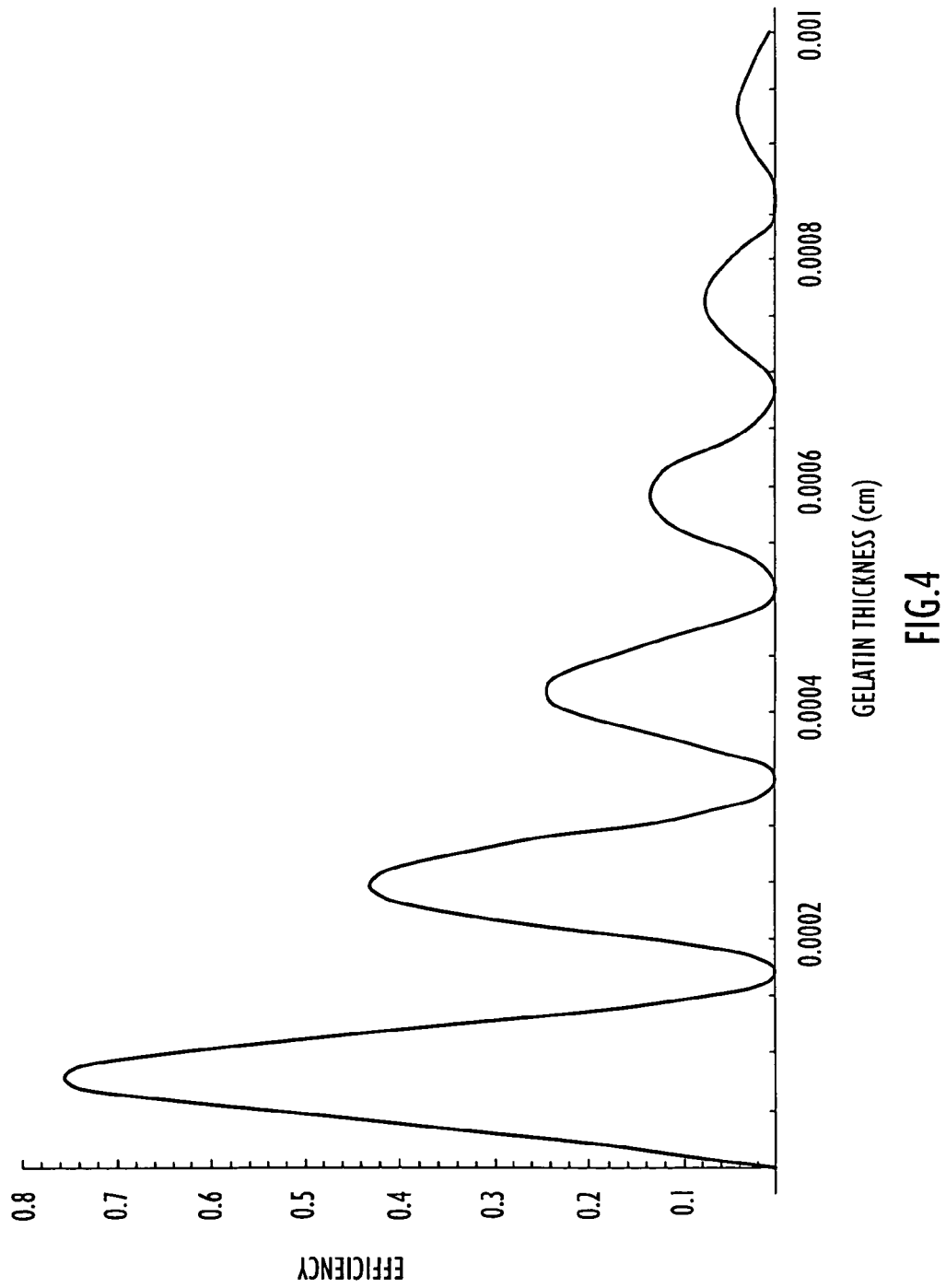
FIG. 4 is shows a plot of grating efficiency versus thickness of the gelatin layer in the grating in support of calculations for the ideal gelatin thickness.

The relation given by Equation 5 is shown by the curve in FIG. 4 (each peak represents successive orders of refraction; the left-most peak corresponds to the order m=1). To find the ideal gelatin thickness, we take the derivative of τ with respect to x, $$\frac{d\tau}{dx} = e^{-\mu x} \sin^2(\alpha x)[2\alpha\cos(\alpha x) - \mu\sin(\alpha x)] \quad (6)$$

(in which the substitution α=πΔn/λ cos θ), set this derivative equal to 0, and solve the resulting equation for x. The only non-trivial solutions are shown below:

$$x = \frac{1}{\alpha}\tan^{-1}\left(\frac{2\alpha}{\mu}\right) \quad (7a, 7b)$$

$$= \frac{\lambda\cos\theta}{\pi\Delta n}\tan^{-1}\left(\frac{2\pi\Delta n}{\lambda\mu\cos\theta}\right).$$

Once this value is established, the expression for the maximum efficiency, $\tau_{max}$, is $$\tau_{max} = \exp\left[-\left(\frac{\pi\mu\Delta n}{\lambda\cos\theta}\right)\tan^{-1}\left(\frac{2\pi\Delta n}{\lambda\mu\cos\theta}\right)\right] \cdot \left[1 + \frac{1}{-1 - \frac{4\Delta n^2\pi^2}{\lambda^2\mu^2\cos^2\theta}}\right]; \quad (8)$$

when all of the basic grating parameters are included, Equation 8 becomes $$\tau_{max} = \exp\left[-\left(\frac{\pi\mu\Delta n}{\lambda\sqrt{1-\frac{\Gamma^2\lambda^2 m^2}{4n^2}}}\right)\tan^{-1}\left(\frac{2\pi\Delta n}{\lambda\mu\sqrt{1-\frac{\Gamma^2\lambda^2 m^2}{4n^2}}}\right)\right] \cdot \quad (9)$$

$$\left[1 + \frac{1}{-1-\frac{4\Delta n^2 \pi^2}{\lambda^2\mu^2\left(1-\frac{\Gamma^2\lambda^2 m^2}{4n^2}\right)}}\right].$$

For the mid-range (nominal) values $\mu=3326.7944$ cm$^{-1}$, $\lambda=260$ nm, $\Delta n=0.14$, $m=1$, $n=1.3$, and $\Gamma=4000$ mm$^{-1}$, the blaze angle $\theta$ is 23.°578178 and the ideal gelatin thickness is 0.802 μm; this results in a maximum theoretical efficiency of 75.96%.

These results provide for the calculation of the ideal gelatin thickness for VPHGs in any given configuration ($\alpha=\beta$ and $\phi=0$). Should dichromate be left in the gelatin layer after processing (set-up and dichromate removal), the grating will be less efficient than these results indicate since the dichromate acts as an additional scatterer/absorber for incoming photons.

One method of assembling the diffraction grating 10 is to deposit the gelatin material for the layer 42 onto the substrate 20 at the desired thickness. The gelatin is allowed to set, and the chromate is then removed. Next, the frame member 44 is attached to the substrate 20 circumscribing the gelatin layer 42. Some of the gelatin material may be removed to make room for the frame member 44 on the substrate 20. The adhesive 46 is disposed around the exterior surfaces of the frame member 44. The cover 30 is then placed over the substrate-frame sub-assembly and adhered to the substrate 30 by the adhesive 46.

Turning to FIG. 5, operation of the grating 10 will be described. Incoming (source) light hits the grating at the cover side of the grating. Some of the incoming light in the 1$^{st}$ order (as an example in this case) is reflected from the cover, and the rest continues through the gelatin layer to the substrate. The light that is transmitted by the substrate includes transmitted light in the 0$^{th}$ order and transmitted light in the 1$^{st}$ order. There is no refracted light into higher (or other competing) or negative orders and reflected light only travels 180 degrees to the refracted light or to the transmitted light.

The diffraction grating device and related concepts may be used in many applications, including any remote-sensing and/or imaging application that incorporates a spectrograph designed and/or used in the far blue or UV wavelength regime. In addition, it may be useful in astrophysics-related equipment and spaced-based observation devices that use a spectrograph designed and/or used in the far blue or UV wavelength regime.

The system and methods described herein may be embodied in other specific forms without departing from the spirit or essential characteristics thereof. The foregoing embodiments are therefore to be considered in all respects illustrative and not meant to be limiting.

What is claimed is:

1. A volume-phase holographic diffraction grating device for use in the ultraviolet (UV) spectral region, comprising:
   a. first and second opposing members;
   b. a gelatin layer between the first and second members, said gelatin layer having a thickness in the range of 0.5 to 1 micron and having a region with varied indexes of refraction created by a hologram formed in said gelatin layer, wherein the gelatin layer resides on said first member; and
   c. a frame member disposed around peripheral edges of the gelatin layer and positioned between the first and second opposing members, wherein the frame member forms a gap volume region between the gelatin layer and the second member so that the gelatin layer is not in contact with said second member.

2. The device of claim 1, wherein the first member, second member and frame member are formed of a glass material.

3. The device of claim 2, and further comprising an adhesive material that adheres the first and second members together and adheres both the first and second members to the frame member.

4. The device of claim 1, and further comprising an anti-reflective coating formed on air-interface surfaces of the first and second opposing members, wherein the anti-reflective coating has a high transmissivity in a spectral region of interest.

5. The device of claim 1, wherein the gelatin layer is subjected to a chemical process to remove chromium after the gelatin layer has set.

6. The device of claim 1, wherein the gelatin layer has a thickness of approximately 0.8 microns.

7. The device of claim 1, wherein gelatin layer has a thickness in the range of 0.5 to 1 micron that minimizes absorption and scattering and maximizes efficiency of the grating device.

8. The device of claim 1, wherein the second member receives incoming UV light that is diffracted and dispersed by the gelatin layer and the first member transmits diffracted and dispersed light of a desired dispersion order.

9. A volume-phase holographic diffraction grating device, comprising:
   a. a cover member and a substrate member both formed of a glass material;
   b. a frame member between said cover member and said substrate member forming a gap volume region therebetween; and
   c. a layer of gelatin material on a surface of said substrate member in said gap volume region between the cover member and the substrate member such that the layer is not in contact with the cover member, said layer of gelatin material having a region with varied indexes of refraction created by a hologram formed therein.

10. The device of claim 9, wherein the frame member is formed of glass material.

11. The device of claim 9, and further comprising an adhesive disposed around outer edges of the frame member that adheres the substrate member and cover member together and to the frame member.

12. The device of claim 9, wherein said layer is subjected to a chemical process to remove chromium after the gelatin material has set.

13. The device of claim 9, wherein said layer has a thickness in the range of 0.5 to 1 micron.

14. The device of claim 9, wherein said layer has a thickness of approximately 0.8 microns.

15. The device of claim 9, wherein said layer has a thickness that minimizes absorption and scattering and maximizes efficiency of the grating device.

16. The device of claim 9, wherein the cover member receives incoming ultraviolet (UV) light that is diffracted and dispersed by the layer of gelatin material and the substrate member transmits diffracted and dispersed light of a desired dispersion order.

17. A volume-phase holographic diffraction grating device, comprising:
   a. a first member and a second member, both formed of glass material;
   b. a layer of gelatin material having a hologram with varied indexes of refraction, wherein said layer has a thickness of approximately 0.8 microns and resides on said first glass member; and
   c. a frame member disposed around peripheral edges of the layer of gelatin material and positioned between the first and second members, wherein the frame member forms a gap volume region between the layer of gelatin material and the second glass member so that the gelatin layer is not in contact with said second glass member.

18. The device of claim 17, wherein the frame member is formed of a glass material.

19. The device of claim 17, and further comprising an adhesive material that adheres the first and second members together and to the frame member.

20. The device of claim 17, wherein the gelatin layer is subjected to a chemical process to remove chromium after the gelatin layer has set.

21. The device of claim 17, wherein the second glass member receives incoming light that is diffracted by the layer of gelatin material and the first glass member transmits diffracted and dispersed light of a desired dispersion order.

22. A method for diffracting light for spectroscopy applications, comprising:
   a. providing a diffraction grating comprising first and second opposing members and a gelatin layer residing on said first member, wherein said gelatin layer has a thickness in the range of 0.5 to 1 micron and has a region of varied indexes of refraction created by a hologram formed therein; and
   b. positioning the diffraction grating to receive incoming light at said second member such that the light is diffracted and dispersed by the gelatin layer and the first member transmits dispersed light of a desired dispersion order, wherein providing further comprises providing the diffraction grating wherein the gelatin layer is not in contact with the second member.

23. The method of claim 22, wherein positioning comprises positioning the diffraction grating to receive incoming ultraviolet (UV) light at the second member and to transmit dispersed UV light from the first member.

* * * * *

UNITED STATES PATENT AND TRADEMARK OFFICE
CERTIFICATE OF CORRECTION

| | |
|---|---|
| PATENT NO. | : 7,136,205 B1 |
| APPLICATION NO. | : 11/255955 |
| DATED | : November 14, 2006 |
| INVENTOR(S) | : Anthony Bresenhan Kaye |

Page 1 of 1

It is certified that error appears in the above-identified patent and that said Letters Patent is hereby corrected as shown below:

Col. 2, line 4:   replace "11B" with -- 1B --

Col. 2, line 12:   replace "11B" with -- 1B --

Signed and Sealed this

Thirteenth Day of November, 2007

JON W. DUDAS
*Director of the United States Patent and Trademark Office*